United States Patent Office 3,430,771
Patented Mar. 4, 1969

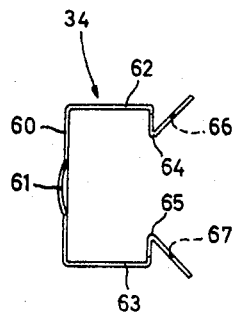 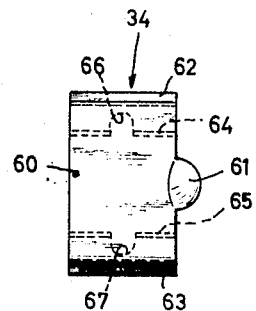 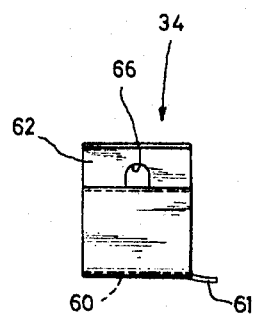
Fig. 4  Fig. 5  Fig. 6
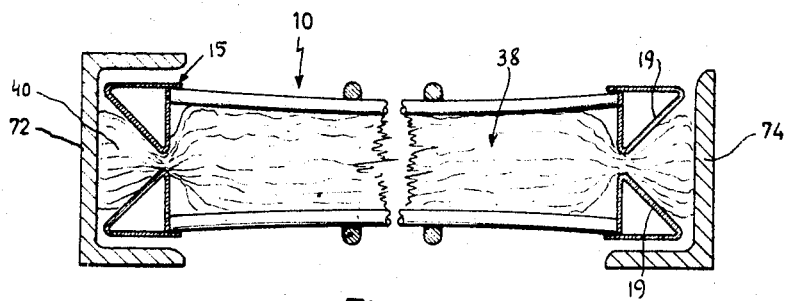
Fig. 7
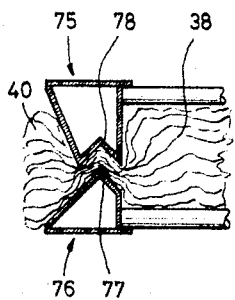 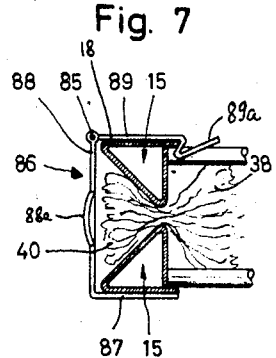 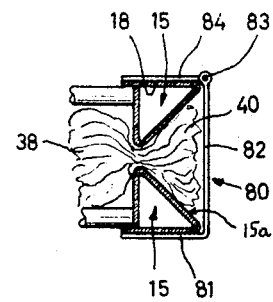
Fig. 8  Fig. 10  Fig. 9

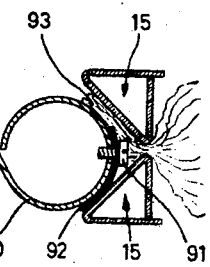
Fig. 11
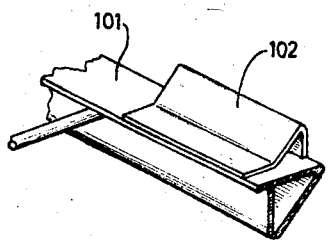
Fig. 12
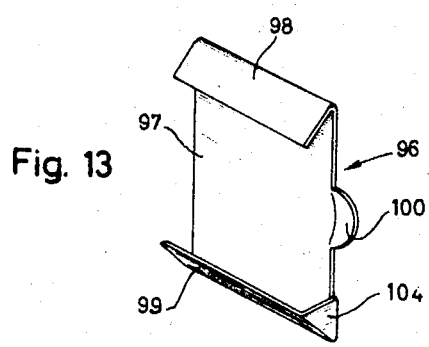
Fig. 13
Fig. 14
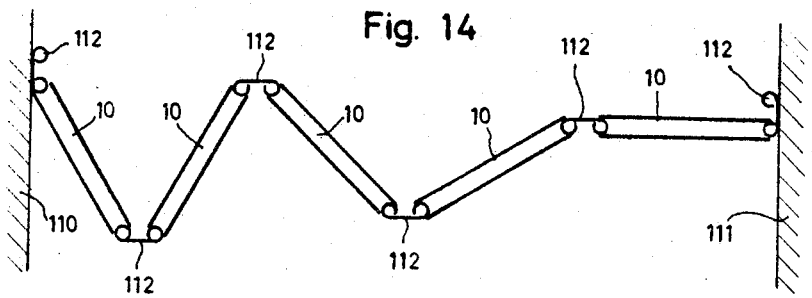

3,430,771
FILTER ASSEMBLY
Elmer Dreher, 26 Rue des Chainettes,
Yverdon, Vaud, Switzerland
Filed Oct. 5, 1966, Ser. No. 584,532
Claims priority, application Germany, Oct. 5, 1965,
D 48,354
U.S. Cl. 210—323    21 Claims
Int. Cl. B01d 25/14

ABSTRACT OF THE DISCLOSURE

A filter assembly including a mat of deformable filter material, a frame including a pair of frame sections disposed at opposite side of the mat and having cooperating sealing portions engaging the mat to compress the filter material, the frame members define between themselves an outer groove surrounding the sealing portions into which marginal zones of the mat extend, and a plurality of clips engaging the frame sections to maintain the sealing portions thereof in compressive engagement with the material of the mat.

---

The present invention relates to filters in general, and more particularly to improvements in filter assemblies of the type utilizing woven or felted mats of cotton wool, linen fibre, cellulose pulp, metal fibres, sponge or other deformable filter materials. Still more particularly, the invention relates to improvements in filter assemblies wherein one or more prefabricated filtering cells are mounted in a supporting structure.

It is already known to insert a mat of fibrous material into a frame and to thereupon mount such frame in a suitable supporting structure. In order to avoid undesirable leakage between the frame of the cell and the supporting structure, such filter assemblies must be provided with special seals. As a rule, the frame for the mat consists of U-shaped or similar profiled stock which receives the edges of the mat and is insertable into the supporting structure by interposition of elastic sealing elements. Such sealing elements are expensive and their sealing action deteriorates with age. Furthermore, proper mounting or removal of filtering cells requires much time so that the filter assembly is out of commission for extended periods whenever the person or persons in charge wish to inspect, clean or replace one or more filtering cells.

Another drawback of presently know filter assemblies which utilize prefabricated filtering cells is that the position of cells with reference to the supporting structure and the position of the supporting structure with reference to the walls of the apparatus or installation where the assembly is put to use cannot be changed at will. Also, cells are often installed in such a way that their filtering action is unsatisfactory, either because the plane of the mat is not in an optimum position with reference to the direction of fluid flow or because one of the cells interferes with the flow of fluid through the other cell or cells. Still further, supporting structures for cells of many conventional filter assemblies permit insertion or withdrawal of cells in a single direction so that it is often very difficult to reach a particular cell.

Accordingly, it is an important object of my invention to provide a novel and improved filter assembly wherein the filtering cells are constructed and assembled in such a way that each cell can be nistalled in a supporting structure without the utilization of separate sealing elements and wherein two or more properly installed cells are capable of forming satisfactory seals with each other.

Another object of the invention is to provide a filter assembly whose cells may be inserted and/or withdrawn in two or more directions so that the insertion or removal of a given cell can be completed with little loss in time and often without even partial dismantling of the assembly.

A further object of the invention is to provide a filter assembly whose cell or cells and specially including the supporting structure may be prefabricated at low cost, of simple and rugged components, in any desired size and in many shapes, and wherein a mat may be readily removed and replaced with little loss in time.

An additional object of the invention is to provide novel clamping means for the frames of prefabricated filtering cells which can be utilized in the above outlined filter assembly.

Still another object of the instant invention is to provide a filter assembly wherein the number of filtering cells may be increased or reduced at will and wherein the cells may be installed in any desired position of inclination and at any desired distance from each other.

A concomitant object of the invention is to provide a novel supporting structure for the filtering cells of my filter assembly and to construct the components of the supporting structure in such a way that they can form saisfactory seals with mats in automatic response to proper insertion of filtering cells.

Briefly stated, one feature of my invention resides in the provision of a filter assembly which comprises one or more preferably square or rectangular filtering cells each having a mat of deformable filter material and a frame including two frame sections adjacent to the marginal zones and disposed at the opposite side of the mat. The frame sections have cooperating sealing portions disposed opposite each other and engaging the mat to compress the filter material. The marginal zones of the mat have edge portions at least some of which extend outwardly and beyond the sealing portions, preferably beyond the outlines of the frome so that such edge portions may be deformed by the supporting structure in which the cell is mounted when in actual use or by the edge portions of adjoining mats.

In accordance with a preferred embodiment of the present invention, the two frame sections define between themselves an interrupted or complete circumferential groove which surrounds the sealing portions of the frame sections and may receive suitably configurated carriers of the supporting structure. Such carriers may deform the edge portions of the mat against one or both frame sections to form therewith secondary seals in addition to the seal formed by the marginal zones in the regions where such marginal zones are compressed and deformed between the sealing portions.

The sealing portions may be identical or dissimilar; for example, each thereof may be of triangular cross-sectional outline and is then provided with a ridge which penetrates into the respective side of the mat and cooperaes with the other ridge to deform the marginal zone in order to prevent leakage of fluid from the main or central part of he mat to the edge portions which are located outside of the sealing portions.

The novel features which are considered as characteristic of the invention are set forth in particular in the appended claims. The improved filter assembly itself, however, both as to its construction and its mode of operation, together with additional features and advantages thereof, will be best understood upon persual of the following detailed description of certain specific embodiments with reference to the accompanying drawings, in which:

FIG. 4 is an enlarged side elevational view of a clip which may be utilized in the filter assembly of FIG. 1 to couple the frame sections of a cell to each other;

FIG. 5 is a rear elevational view of the clip as seen from the left-hand side of FIG. 4;

FIG. 6 is a top plan view of the clip;

FIG. 7 is a longitudinal section through a modified filter assembly whose cell is mounted in a different supporting structure having profiled carriers;

FIG. 8 is a fragmentary transverse sectional view of a filtering cell whose frame sections are provided with dissimilar sealing portions;

FIG. 9 is a fragmentary longitudinal sectional view of a portion of a filtering cell whose frame sections are pivotable with reference to each other;

FIG. 10 is a similar fragmentary longitudinal sectional view of another portion of the filtering cell shown in FIG. 9;

FIG. 11 is a fragmentary transverse sectional view of a filter assembly utilizing filtering cells of the type shown in FIGS. 9 and 10;

FIG. 12 is a fragmentary perspective view of a modified frame section;

FIG. 13 is a perspective view of a clip which may be utilized to couple frame sections of the type shown in FIG. 12; and FIG. 14 is a diagrammatic side elevational view of a filter assembly with five mutually inclined filtering cells.

Figure 1:
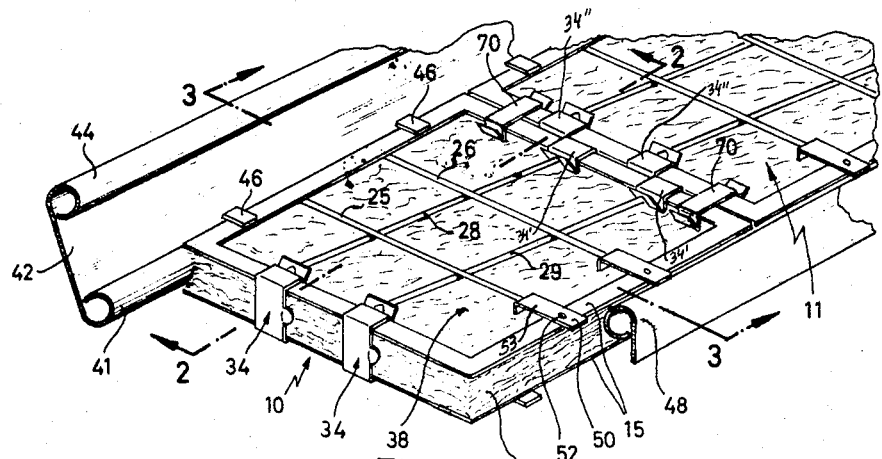
FIG. 1 is a fragmentary perspective view of a filter assembly which comprises a series of abutting filtering cells.
Figure 2:
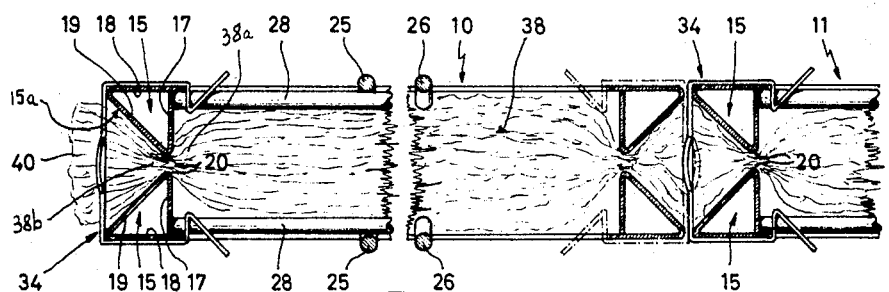
FIG. 2 is an enlarged longitudinal section as seen in the direction of arrows from the line 2—2 of FIG. 1.
Figure 3:
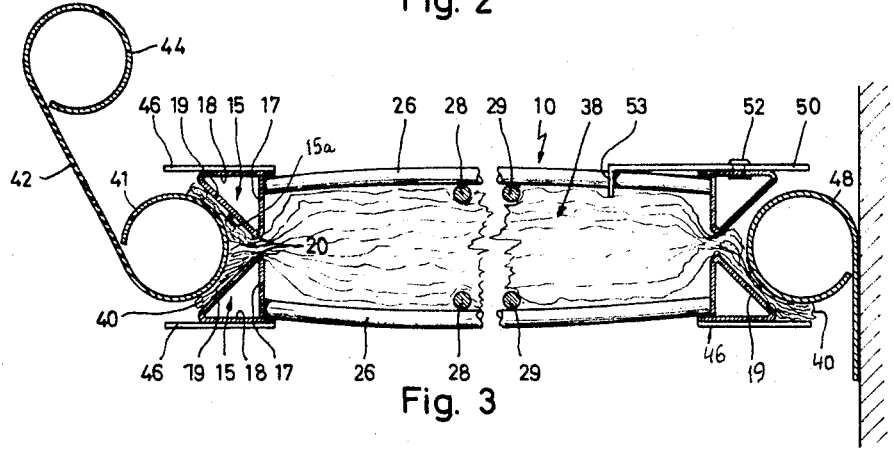
FIG. 3 is an enlarged transverse section through one of the filtering cells as seen in the direction of arrows from the line 3—3 of FIG. 1.

Referring first to FIGS. 1 to 3, there is shown a filter assembly which comprises two identical filtering cells 10 and 11; therefore only the cell 10 will be described in full detail. However, it will be understood that the filter assembly can comprise a single cell or three or more cells; for example, the cell 10 of FIG. 1 can be located between two cells of which only the cell 11 is actually shown.

The cell 10 comprises a mat 38 of deformable fibrous filter material which is of square or rectangular outline and is installed in a composite frame including two identical frame sections 15. These sections are located at the opposite sides of the mat 38 and each thereof comprises a rectangular border 18 composed of two pairs of parallel strip-shaped members and a rectangular sealing portion which is carried by the border 18 and extends inwardly from the respective side of the mat 38 so as to deform a circumferentially complete region 38b of the marginal zone 38a of the mat 38 in a manner clearly shown in FIGS. 2 and 3 whereby the edge portions 40 of the marginal zone 38a extend outwardly beyond the sealing portions of the frame sections 15 and preferably beyond the outlines of such frame sections. Each sealing portion comprises an inner wall 17 which is substantially normal to the plane of the mat 38 and an inclined outer wall 19 extending from the outer edge of the border 18 toward the inner edge of the wall 17. The sealing portions are of substantially triangular cross-sectional outline and taper inwardly from the respective sides of the mat 38 so that their ridges 20 deform the region 38b of the marginal zone 38a and prevent leakage of a fluid medium from the centrally located main portion of the mat 38 into the edge portions 40. The frame sections define between themselves a circumferentially complete groove 15a (shown in FIGS. 2 and 3) which surrounds the sealing portions 17, 19, 20 of both frame sections and accommodates the edge portions 40. In fact, and as stated before, the edge portions 40 preferably extend outwardly and beyond the groove 15a. Sealing portions of triangular cross-sectional outline are very satisfactory because their inclined walls 19 form the groove 15a and also because they can form a second seal with the supporting structure in which the cell 10 is mounted when in actual use.

Each of the frame sections 15 further comprises two sets of elongated rods or stays 25, 26 and 28, 29 whose ends are welded or otherwise secured to the parallel members of the borders 18. The stays 25, 26, 28, 29 bear against the outer sides of the mat 38 and hold the latter against excessive bulging (see FIG. 3). The intersections between the stays 25, 26 and 28, 29 may but need not be welded or otherwise connected to each other. It will be seen that the stays 28, 29 are not exactly normal to the stays 25, 26, i.e., that they make acute angles with the parallel members of the border 18 shown in FIG. 3. The purpose of such mounting of the stays 28, 29 will be described in connection with FIGS. 4, 5 and 6.

The two frame sections 15, 15 are connected to each other by clamping means including a set of discrete elastic clips 34 which are shown in FIGS. 4 to 6. The clamping means further includes clips 70 which engage coplanar frame sections 15 of the filtering cells 10, 11 to hold such cells against movement away from each other. As shown in FIG. 2, the clips 34 can bring about localized deformation of the edge portions 40 but the remainder of these edge portions extends outwardly beyond the clips 34. The purpose of such dimensioning of the mat 38 is that the edge portions 40 may be caused to make with the one or both frame sections 15 a second seal to further prevent leakage of fluid beyond the cooperating ridges 20 of the sealing portions. The left-hand edge portion 40 shown in FIG. 3 is deformed and compressed by an elongated carrier 41 of circular or oval cross-sectional outline which forms part of a supporting structure for the filtering cells 10, 11. The supporting structure further includes a second carrier 48 which extends into the groove 15a opposite the carrier 41 and is permanently or detachably affixed to a wall or the like. The carrier 41 deforms the adjoining edge portion 40 in such a way that the latter bears against both inclined walls 19. The other carrier 48 deforms the adjoining edge portion 40 solely against the lower inclined wall 19. The carrier 41 forms part of a composite carrier unit which further includes a second carrier 44 and a preferably flexible panel 42 which is tangential to and connects the carriers 41, 44 to each other. For example, the parts 41, 42, 44 may be made of sheet metal and preferably form an integral unit. The carrier 44 may be used to deform the edge portion 40 of a further filtering cell which is parallel with or inclined relative to the cell 10.

The carrier 48 is assumed to be fixed to its wall and the carrier 41 may also be fixed to its wall or is assumed to be movable toward and away from the adjoining portion of the groove 15a so that it can subject the edge portion 40 to greater or lesser deforming stresses and that it can be moved away from the groove 15a in order to allow for removal, inspection and/or replacement of the cell 10. The entire carrier unit 41, 42, 44 may be mounted for movement vertically and sideways so as to place the cell 10 into different positions of inclination. Also, the position of the unit 41, 42, 44 may be inverted so that the carrier 44 will engage a filtering cell which is located at a level below the cell 10. In order to prevent accidental detachment of the cell 10 from the carriers 41 and 48, the frame sections 15 may be provided with latches 46 and 50 which extend outwardly beyond the borders 18 and overlie portions of the respective carriers. The latches 46 are welded or otherwise immovably fixed to the left-hand members of the borders 18 (FIG. 3) but the latches 50 are connected to the respective borders 18 by rivets, pins or like fasteners 52 which enable an operator to turn the latches 50 to the positions shown in FIGS. 1 and 3 in which the outer portions of these latches extend outwardly beyond the outlines of the respective border 18, or to ineffective positions in which the entire latch 50 is located within the confines of the frame. The latches 50 allow for convenient detachment of the cell 10 from the carrier 48. It will be seen that each latch 50 further comprises a bifurcated portion 53 which can straddle the adjoining stay 26 or 28 whereby its outer portion overlies the carrier 48. In order to disengage the bifurcated portions 53, the latches 50 must be deformed. This requires little effort because the latches 50 preferably consist of thin elastically deformable steel sheet stock or synthetic plastic. The latches 50 enable an operator to insert the cell 10 of FIG. 3 from below after the carrier 41 is swung to the left to permit the upper fixed latch 46 to move to a position at a level above the carrier 41 and if the upper right-hand member of the border 18 can move past the carrier 48, even without the carrier 41 being swung to the left, if the fixed distance between the carriers 41 and 48 is prepared for that purpose.

FIGS. 4 to 6 illustrate one of the clips 34. This clip comprises a substantially U-shaped body having a base or web 60 and two flanges or legs 62, 63 provided with suitably deformed snap-on portions or hooks 64, 65 each of which has a cutout 66, 67 adapted to receive a portion of a stay 28 or 29. The web 60 has an outwardly extending rounded projection or lug 61 which can be interfitted with a similar projection provided on a clip 34 of the clamping means for the frame sections 15, 15 of the adjoining filtering cell. Such interfitting between the projections 61 of clips 34 on adjoining cells is possible because the stays 28, 29 are not exactly normal to the stays 25, 26. As shown in FIG. 1, two clips 34' of the cell 10 are sufficiently close to two clips 34" of the cell 11 to have their projections 61 in satisfactory engagement whereby such projections prevent undesired shifting of the cell 10 away from the cell 11 or vice versa. The clips 34 are preferably slidable lengthwise of the respective borders 18 and the hooks 64, 65 of their flanges 62, 63 can be moved apart by exertion of a certain force to allow for complete separation of clips from the frame sections 15.

The clips 70 are somewhat similar to the clips 34 but serve to establish direct connections between the borders 18 of the cells 10 and 11. Each of these clips 70 has a web and two hooks similar to the hooks 64, 65 shown in FIG. 4 and adapted to snap behind the coplanar borders 18 of the cells 10, 11. The clips 70 are provided in addition to or they may be used as substitutes for the projections 61 on the clip 34.

FIG. 7 shows a modified supporting structure for a filtering cell 10. This supporting structure comprises a substantially L-shaped carrier 74 and a substantially U-shaped carrier 72. The edge portions 40 of the mat 38 extend so far beyond the outlines of the frame sections 15 that they undergo deformation by the carriers 72, 74 and are held in sealing engagement with the inclined walls 19. The clips 34 are not shown in FIG. 7.

FIG. 8 illustrates a portion of a modified filtering cell wherein the marginal zones of the mat 38 are compressed by dissimilar sealing portions provided on two frame section 75, 76. The frame section 75 has a sealing portion which defines a circumferentially complete depression or valley 78 receiving a ridge 77 provided on the sealing portion of the frame section 76. In this way, the material of the mat 38 in the depression 78 is bent back and forth to further improve the sealing action. It is clear that the frame section 75 may be provided with two valleys 78 and that the section 76 may have two or more ridges 77. The two sealing portions mesh not unlike the teeth of two gears and provide a very satisfactory seal between the main body portion and the edge portions 40 of the mat 38.

FIGS. 9 and 10 show portions of a further filtering cell which is practically identical with the cell 10 of FIGS. 1 to 3 but is provided with modified clamping means. The latter comprises two types of clips which are respectively numbered 80 and 86. The right-hand clip 80 has a base or web 82 which extends across the groove 15a, a first flange 81 which is welded or otherwise fixedly secured to the lower frame section 15, a second flange 84 which is welded to the upper frame section 15, and a hinge 83 which connects the web 82 with the flange 84. The other clip 86 has a web 88, a first flange 87 which is welded to the lower frame section 15, a second flange 89 provided with a bent-over portion or hook 89a which can snap behind the adjoining border 18 of the upper frame section 15, and a hinge 85 which connects the web 88 with the flange 89. If it becomes necessary to replace the mat 38 with a fresh mat or to temporarily remove the mat 38 for the purpose of cleaning, the hook 89a is disengaged from the border 18 so that the flange 89 can be turned about the axis of the hinge 85. The upper frame section 15 is then turnable about the hinge 83 and exposes the mat. The web 88 of the clip 86 has a projection or lug 88a which is a functional equivalent of the projection 61 shown in FIG. 5.

When the upper frame section 15 of FIGS. 9 and 10 is pivoted away from the lower frame section 15, the latter can be held in requisite position by an arrangement which is shown in FIG. 11. The carrier 90 is connected to the lower section 15 by means of a tongue, strap or analogous connector 92. In the illustrated embodiment, the connector 92 is welded to the lower frame section 15 and is detachably connected with the carrier 90 by one or more screws 91 or like fasteners. The edge portion 93 of the mat is deformed between the carrier 90 and the upper frame section 15. Of course, and if it is more convenient to pivot the lower frame section 15 with reference to the upper frame section, the carrier 91 will be connected to the upper frame section.

FIG. 13 illustrates a modified clip 96 which may be used to connect the borders of two mirror symmetrical frame sections. One such border 101 is shown in FIG. 12. It is provided with a guide rail 102 which can be welded or otherwise affixed thereto. The other border 101 (not shown) is provided with a second rail 102. The clip 96 comprises a web 97 provided with an outwardly bent projection or lug 100 (corresponding to the lug 61 of FIG. 5) and two mutually inclined sliders 98, 99 each of which can be slipped onto one of the guide rails 102. A stop 104 on the lower slider 99 will abut against the respective rail 102 when the clip 96 is moved to requisite position.

Referring finally to FIG. 14, there is shown a composite filter assembly which includes five mutually inclined filtering cells 10 and several carrier units 112 which connect the cells 10 to each other and to supporting walls 110, 111. Each unit 112 comprises two carriers and a panel therebetween. Of course, the showing of FIG. 14 is purely diagrammatic because the inclination, number and dimensions of the cells 10 can be selected at will and the carrier units 112 may be replaced by or used in combination with other types of carrier units. As stated before, the units 112 or analogous carrier units can be used to support cells 10 in parallelism with and at a desired distance from each other.

It will be seen that an important feature of the improved filter assembly resides in such dimensioning of the mats 38 that the edge portion 40 or 39 of their marginal zones extend beyond the sealing portions of the frame sections 15 so that such outwardly extending edge portions may form one or more additional or secondary seals, depending upon whether the carriers press the edge portions against one or both frame sections. If the carriers 41, 44, 48 or 90 are of circular cross-sectional outline, they may be readily turned with reference to the filtering cells or vice versa. The filter assembly may be used as a covering for side walls, ceilings or for other purposes. Also, the use of aforedescribed carriers and carrier units allows for insertion or removal of filtering cells in three directions, namely, from the rear side (concurrent with the flow of fluid through the mats), from the front side (countercurrent), or sideways (transversely of the fluid flow).

An important advantage of my filter assembly is seen to reside in that the cell or cells 10, 11 can be installed in a supporting structure, such as one including the carrier units 112 and walls 110, 111 of FIG. 14, without necessitating the provision of additional seals between the frame of the cell and the carrier units. This is due to the fact that the carriers 41, 44, 48 or 90 can be placed in direct sealing engagement with the edge portion 40 or 93 of the mats so that no leakage will occur between such carriers and the cells. The gaps between the adjoining cells (such as the cells 10, 11 of FIG. 1) can be sealed by placing the two cells so close to each other that the edge portions of their mats deform each other and form a network of interlaced filaments or fibers which provide an effective seal without necessitating the provision of separate sealing elements. The clips 70 insure that the edge portions of adjoining mats remain in satisfactory sealing engagement with each other.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a filter assembly including at least one filtering cell comprising a mat of deformable filter material; a frame including a pair of separate frame sections adjacent to edge portions of said mat and disposed at opposite sides of said mat, said frame sections having each cooperative sealing portions disposed opposite and engaging the mat along said edge portions thereof so as to compress the filter material, said frame sections define between themselves an outer groove surrounding said sealing portions and widening in outward direction into which edge portions of said marginal zones extend; and clamping means in form of a plurality of discrete clips having portions engaging and connecting said frame sections to each other to maintain said sealing portions thereof in compressive engagement with the material of said mat.

2. A structure as defined in claim 1, wherein said frame is of polygonal outline.

3. A structure as defined in claim 1, wherein said sealing portions are mirror symmetrical with reference to the central plane of said mat and comprise ridges which extend inwardly from the respective sides of the mat.

4. A structure as defined in claim 1, wherein said sealing portions are of substantially triangular cross-sectional outline and taper inwardly from the respective sides of said mat.

5. A structure as defined in claim 1, wherein the cross-sectional outlines of said sealing portions are different.

6. A structure as defined in claim 5, wherein one of said sealing portions comprises a ridge and the other sealing portion is provided with a depression into which said ridge extends.

7. A structure as defined in claim 1, wherein each of said frame sections comprises a border provided with the respective sealing portion and elongated stays surrounded by and having ends secured to the respective border, said clips being connected with the borders of said frame sections and having portions engaging said stays.

8. A structure as defined in claim 7, wherein said borders are of susbtantially rectangular outline and comprise pairs of parallel members, at least one of said stays making an acute angle with at least one pair of said members.

9. A structure as defined in claim 1, wherein at least some of said clips consist of elastic material and engage with the frame sections by snap action.

10. A structure as defined in claim 1, wherein each of said frame sections comprises a border supporting the respective sealing portion and including straight members extending in parallelism with the members of the border forming part of the other frame section, at least one of said clips engages with and is slidable longitudinally along two parallel members of said borders.

11. A structure as defined in claim 1, further comprising a second filtering cell adjacent to said first named filtering cell, at least one of said clips of one of said cells being interfitted with a clip of the other cell.

12. A structure as defined in claim 1, wherein the portions of at least one of said clips being hingedly connected to each other and being fixed to the respective frame sections so that such secitons can be pivoted toward and away from each other.

13. A structure as defined in claim 1, further comprising a second filtering cell adjacent to said first named cell, at least one of said clips engages with a frame section of each of said cells to thereby hold such cells against movement with reference to each other.

14. A structure as defined in claim 1 further comprising latch means mounted on at least one of said frame sections and having a portion extending outwardly beyond the outline of said frame.

15. A structure as defined in claim 14, wherein said latch means is turnably mounted on said one frame section and is turnable to a position in which said portion thereof is located substantially within the confines of said frame.

16. A structure as defined in claim 1, further comprising supporting means for said filtering cell, said supporting means comprising carrier means bearing against said edge portions to compress such edge portions against at least one of said frame sections.

17. A structure as defined in claim 16, wherein said carrier means extend into said groove.

18. A structure as defined in claim 17, wherein said carrier means is of substantially circular cross-sectional outline.

19. A structure as defined in claim 16, wherein said carrier means comprises pairs of carriers and panels connecting each pair of carriers to each other.

20. A structure as defined in claim 19, wherein said carriers are of circular cross section and wherein said panels are susbtantially tangential to such carriers.

21. A structure as defined in claim 19, wherein said panels are flexible.

References Cited

UNITED STATES PATENTS

| | | | |
|---|---|---|---|
| 2,754,928 | 7/1956 | Hambrecht et al. | 55—501 |
| 2,792,906 | 5/1957 | Evans | 55—502 |
| 2,935,157 | 5/1960 | First | 55—502 X |
| 2,836,258 | 5/1958 | Price. | |
| 2,953,824 | 9/1960 | Minick. | |
| 3,076,303 | 2/1963 | Durgeloh | 55—511 |
| 3,142,550 | 7/1964 | Kuehne | 55—495 |
| 3,250,063 | 5/1966 | Andrews | 210—485 X |
| 3,293,834 | 12/1966 | Donachiue | 210—485 X |

REUBEN FRIEDMAN, *Primary Examiner.*

JOHN ADEE, *Assistant Examiner.*

U.S. Cl. X.R.

55—483, 484, 501, 509; 210—485